March 8, 1927.

C. T. ORDWAY 1,620,568

CENTRIFUGAL MACHINE

Original Filed July 9, 1921   6 Sheets-Sheet 3

March 8, 1927. 1,620,568
C. T. ORDWAY
CENTRIFUGAL MACHINE
Original Filed July 9, 1921   6 Sheets-Sheet 5

WITNESSES
INVENTOR
C.T. ORDWAY
BY
ATTORNEYS

March 8, 1927.

C. T. ORDWAY

1,620,568

CENTRIFUGAL MACHINE

Original Filed July 9, 1921  6 Sheets-Sheet 6

WITNESSES

INVENTOR
C. T. ORDWAY
BY
ATTORNEYS

Patented Mar. 8, 1927.

1,620,568

UNITED STATES PATENT OFFICE.

CARROLL THOMAS ORDWAY, OF BROOKLYN, NEW YORK, ASSIGNOR OF ONE-HALF TO CHARLES ORDWAY, OF BROOKLYN, NEW YORK.

CENTRIFUGAL MACHINE.

Application filed July 9, 1921, Serial No. 483,447. Renewed January 24, 1927.

My invention relates to a centrifugal machine, such as is utilized in the production of sugar, and aims to provide certain accessories and attachments for a conventional machine of this type by means of which improved results may be achieved.

In the conventional type of centrifugal machine utilized in the sugar industry, it is a well appreciated fact that the following main operations are resorted to: First, the mass of material is conducted from the receiving vat or hopper into the centrifugal, this movement being permitted by means of a suitable type of valve. Second, a stream of water is directed against the mass now within the centrifugal, while the latter is revolving, at high speed, and the mass is thus purged upon the fluid passing through it, it being noted that the stream of water is shut off and the centrifugal allowed to rotate at high speed for a predetermined length of time thus drying the mass, this latter operation virtually forming a part of the purging action to which the mass is subjected. Third, it will now be found that the mass lies in intimate contact with the inner side face of the centrifugal, and with a view of discharging the same, a number of different expedients have been resorted to such as that of utilizing a scraper to loosen the mass while the centrifugal is revolving, to subsequently stop the operation of the centrifugal, and to manually remove the mass, or to perform the entire operation manually, etc.

It is to be noted in connection with the first operation that considerable difficulty has been experienced in connection with the types of valves utilized in that the valves have not operated efficiently to completely stop the flow of the mass, and also due to the fact that the valve has not been operated with sufficient speed to stop the flow of the mass at just that point where a centrifugal will not receive either excessive or too small an amount of the material to be treated.

With respect to the second operation aforeenumerated, objections have arisen in that a stream of water strikes the layer of material within the centrifugal with such force as to crumble part of the same, which is to be avoided.

The third operation has met with any number of objections in that it has been heretofore necessary to stop the operation of the centrifugal, thus, in addition to the fact that an operator must devote his entire attention to the manipulation of the parts of the machine, it is also necessary for him to effect a removal of the treated mass from the centrifugal.

With these objects in mind my present invention aims to provide a valve particularly adapted for use in connection with centrifugal machines of the type specified, by means of which valve the defects incident to controlling the flow of the mass into the centrifugal will be avoided.

A further object of my invention is the provision of means for use in the association named which means although permitting of the mass being subjected to the cleansing action of water, will introduce this water in such a manner as to preclude any danger of the force of the jet crumbling the mass.

Still another object of my invention is the provision of a discharger which shall be constructed in such a manner as to render the cessation of operation on the part of the centrifugal unnecessary, aside from the fact that the actuation of the discharger will be virtually automatic, thus overcoming the difficulties in this connection.

A still further object of my invention is the construction and arrangement of the elements aforenamed in such a manner that the same will be commercially feasible, and Still other objects of my invention will appear in the annexed specification taken in connection with the drawings which latter illustrate one practical embodiment of the same, and in which;

Figure 1:
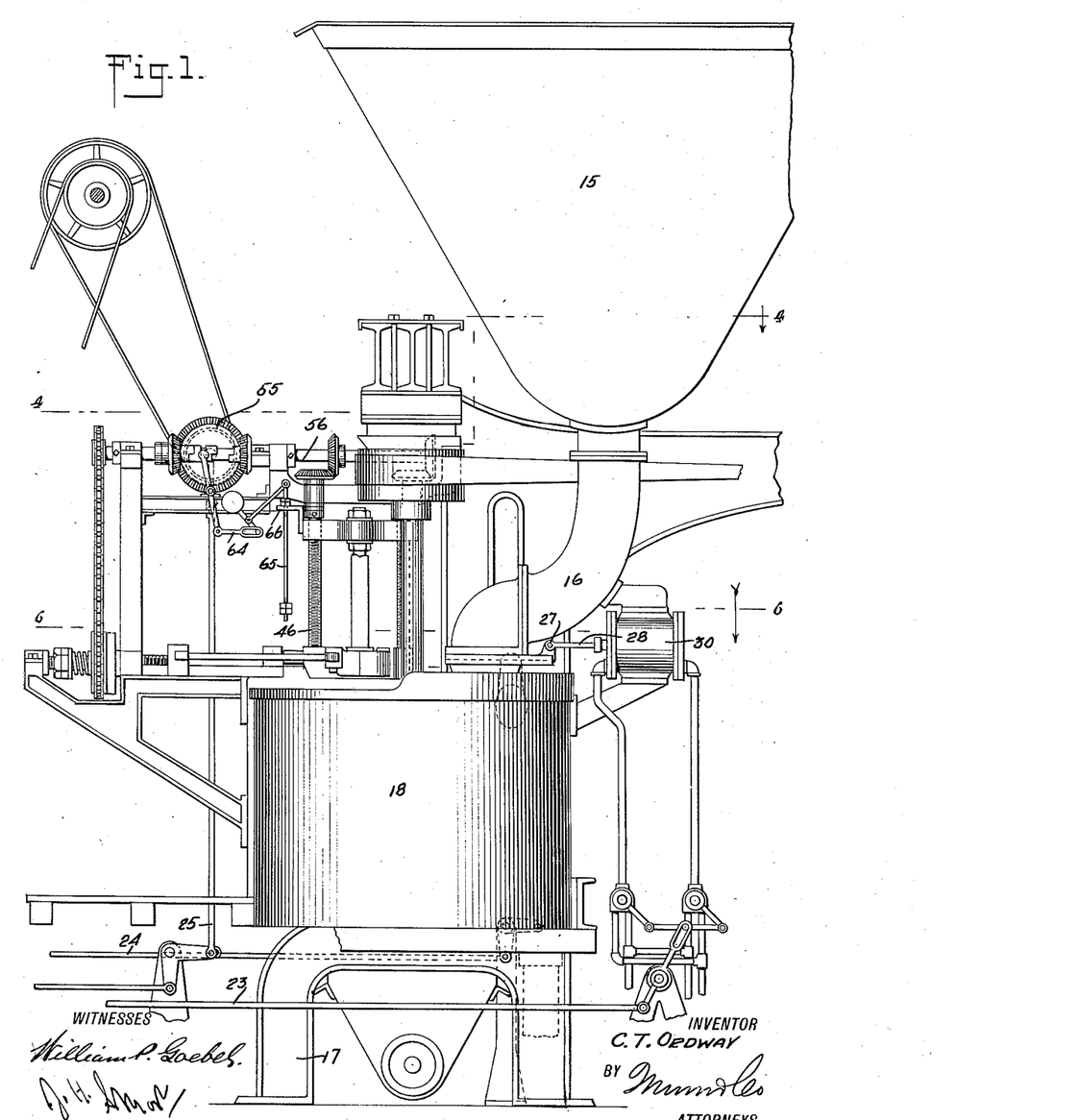
Figure 1 is a side view of the general assembly of a centrifugal machine of the type named and showing my improved structure associated therewith.

Referring now more particularly to Figure 1 it will be seen that the reference numeral 15 indicates the hopper or storage tank of any conventional centrifugal or battery of centrifugal machines from which a charging conduit 16 extends, this extending pipe terminating at a point above the centrifugal proper. This latter element preferably includes a base 17 upon which all of the parts are supported, a tank 18 being fixedly secured upon this base, it being noted that a pan 19 of the centrifugal proper is arranged within and spaced from the tank 18, as in Figure 2.

Figure 8:
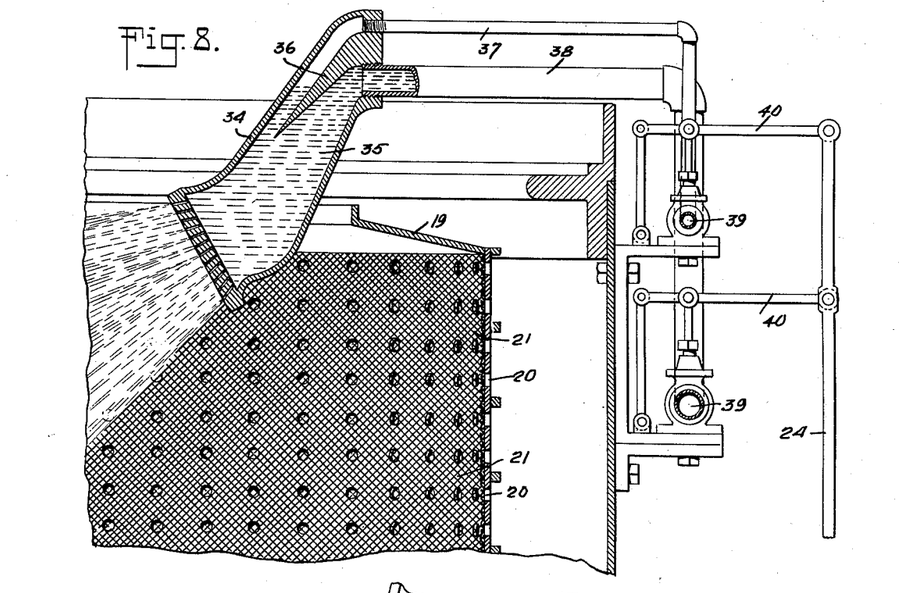
Figure 8 is a fragmentary sectional side view of the apparatus utilized for effecting a mixing of the mass, which view is taken along the line 8—8 and in the direction of the arrows indicated in Figure 9.

The pan may be of any desirable construction such as has been most clearly illustrated in Figure 8. In this view it will be noted that the body of the pan is formed with a mesh 21. Further, as in Figure 2, the pan is freely supported within the tank 18 and is retained in this position by means of a shaft 22, which latter is connected to a suitable driving mechanism hereinafter described through which a rotation of the pan may be effected.

All of the foregoing may be of any desirable construction, and it will be noted in these views that controls, 23, 24 and 25 are provided, which serve to operate a valve, sprayer and discharger respectively. In this connection it is to be noted that the controls are shown in the nature of rods. This is resorted to in that the entire operation of the device is preferably to be automatically controlled by means of an automatic operating device which forms the subject matter of my co-pending application Serial No. 483,448 filed July 9, 1921, now Patent 1,516,402 but it will be appreciated that the controls may be of any desired type so as to be operated by any expedient.

Figures 6, 7:
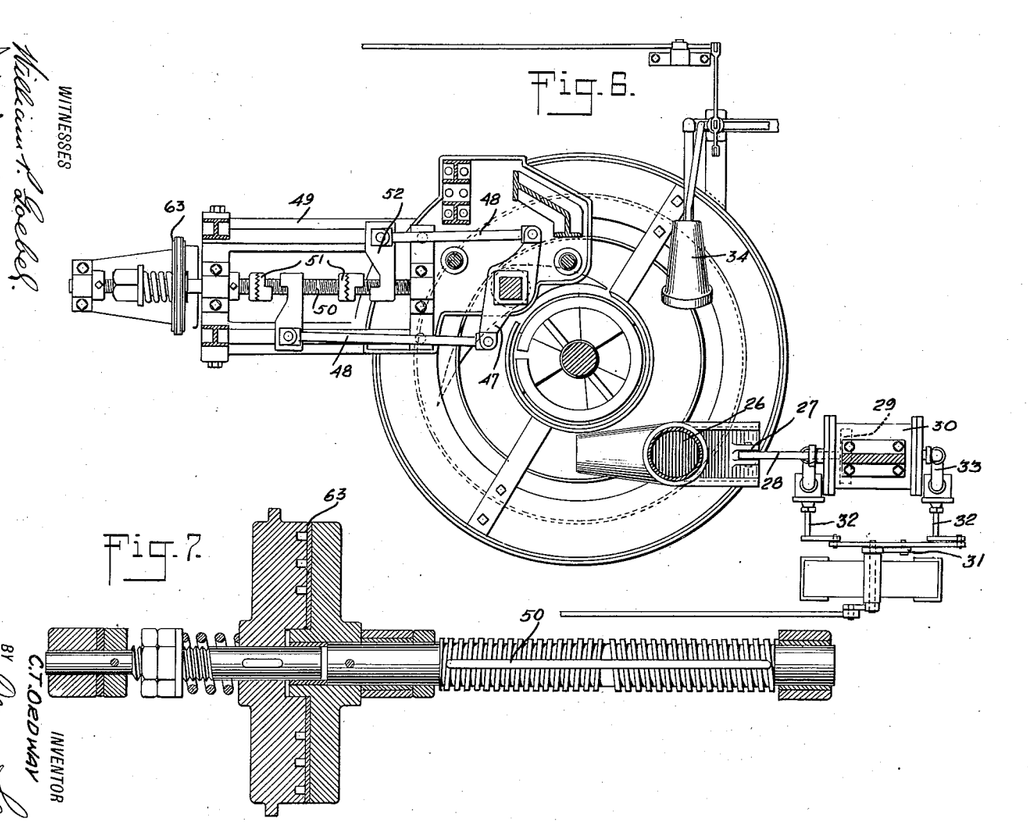
Figure 6 is a sectional plan view taken along the line 6—6 and in the direction of the arrows indicated in Figure 1.
Figure 7 is an enlarged sectional side view of a detail of the discharger.

Attention is now invited to Figure 6, as well as Figure 1. It will be seen reference being had particularly to the former figure that the valve controlling the flow of the mass through the conduits 16 is preferably in the nature of a gate valve, the body of which extends beyond the conduit 16 and is provided with lugs 27 by means of which this element may be coupled to a piston rod 28 secured to a piston 29 movable within a cylinder 30. The control 23 by means of a link mechanism 31 is connected to valves 32 arranged within fluid pressure lines 33.

Thus when the control 23 is moved to one of its extreme positions one of the valves 32 will be closed and the other opened, thus either projecting or retracting the piston 29 and causing a corresponding movement on the part of the valve 26 it being understood that a reversal of movement on the part of the control 23 will actuate the valves to cause the piston 29 to move to its opposite extreme position, thus again moving the valve 26.

By this expedient it will be understood that a rapid and positive opening on the part of the valve 26 will be insured, and that it will only be necessary to effect a slight movement of the control 23 to at all times insure this operation thus eliminating the objection in this connection.

Figure 9:
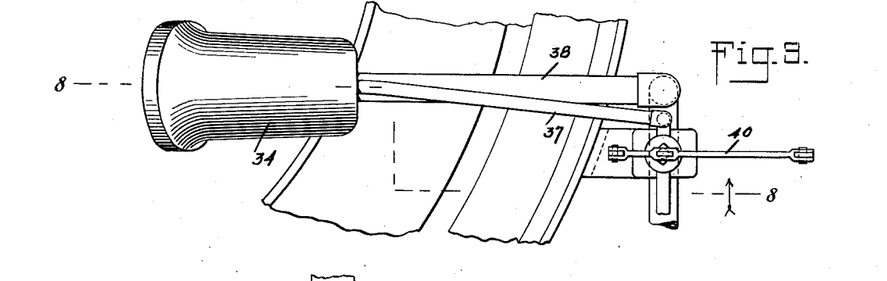
Figure 9 is a plan view of the device as illustrated in Figure 8.
Figure 10:
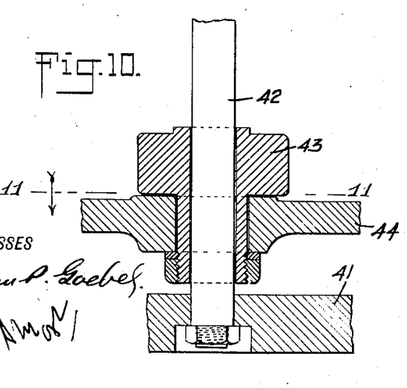
Figure 10 is an enlarged sectional view of one of the details of the discharger mechanism.
Figure 11:
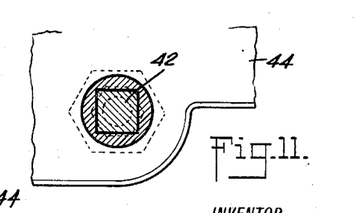
Figure 11 is a sectional plan view taken along the line 11—11 and in the direction of the arrows indicated in Figure 10.

Now with a view of providing means which will permit of the mixing of the mass subsequent to its disposition within the pan 19 of the centrifugal, which means will include the characteristics set forth in the preamble to this specification attention is invited to Figures 8 and 9. In these views it will be noted that a nozzle 34 having any desirable discharger end, has its end projecting into the pan 19 and is preferably disposed at an angle with respect to the walls thereof. Further the nozzle 34 preferably includes a mixing chamber 35 the inner end of which has a partition 36 extending into it. Arranged at opposite sides of this partition are the ends of a pair of feed lines 37 and 38, one of which is connected to a source of air pressure, while the other is connected to a source of water supply, the flow through each being regulated by means of valves 39 the movement of which is synchronized by any suitable link construction 40 in turn connected to the control 24.

Thus upon the control 24 being operated, to open the valves 39, water will be drawn into the nozzle 34, and this water will be aerated and sub-divided into a fine spray by virtue of the fact that the compressed air within the pipe 37 will intermingle with the water within the mixing chamber 35 of the nozzle 34. Thus although the water will be introduced into the pan of the centrifugal in a more finely distributed manner than has heretofore been possible, it will be seen that by virtue of the fact that the water is surcharged with air the force of the spray will be broken thus preventing the water from striking the layer of material built up on the inner face of the pan with sufficient force to cause the same to crumble.

Finally with regard to the discharger it will be noted that a scraper blade 41 is provided which scraper blade extends into the pan 19 of the centrifugal and is mounted upon the end of a rod 42, which latter has a sleeve 43 secured to it, the sleeve being mounted within a member 44. The blade is mounted in the pan with its free end spaced from the vertical wall thereof so as not to initially contact the layer of material which has been impinged against said wall. Through a mechanism presently to be described the blade is simultaneously swung outwardly and moved downwardly into the pan for a predetermined period of time following which said blade is only moved downwardly in said pan while the latter is being rotated. The movement of said blade is so controlled by said mechanism that the blade will be adjusted to the limit of its outward movement in a comparatively short space of time and before said blade has moved downwardly into the pan an appreciable distance. In so doing practically the entire layer of material will be scraped from the wall of the pan, but a small unappreciable quantity will be left adhering to the upper portion of the pan. This is caused by the fact that the scraping blade does not, when it starts to move downwardly, immediately swing to the extreme of its outward movement. However, the length of time consumed in moving the blade to the last-named position is entirely a question of speed and adjustment of the above-mentioned mechanism. Following the scraping operation the material is removed from the pan and the blade returned to its starting position by automatically reversing the movement thereof, that is, starting from the bottom of the pan the blade is initially moved inwardly and upwardly and thereafter only upwardly until it reaches its normal position.

Now with a view of providing means which will serve to automatically effect this operation on the part of the blade it will be noted that the upper end of the rod 42 has secured to it a cross arm 45 which is provided with screw threaded openings through which the screw threaded shanks 46 extend. Thus upon the shafts 46 being rotated the cross arm 45 will act as a traveler and the rod 42 will be carried downwardly, thus accomplishing one of the movements desired.

Further the member 44 presents a pair of ears 47 as in Figure 6 which ears have rods 48 connected to their outer ends. A frame 49 secured to one side of the centrifugal carries an oppositely screw threaded shank 50 in turn having clutch parts 51 attached to it for a purpose hereinafter more fully specified. Also the shaft 50 is engaged by travelers 52 secured one to each of the rods 48 whereby upon the shaft 50 being rotated the travelers 52 will be moved in opposite directions thus actuating the rods 48 and the ears 47 of the member 44 which in turn will serve to oscillate the rod 42 and in turn the scraper blade 41 carried thereby.

Thus by the structure described in the preceding paragraph it will be understood that the second movement which it is desired to impart to the scraper blade will be accomplished in that the latter will be swung as it is moved downwardly into the pan 19 of the centrifugal.

Figures 4, 5:
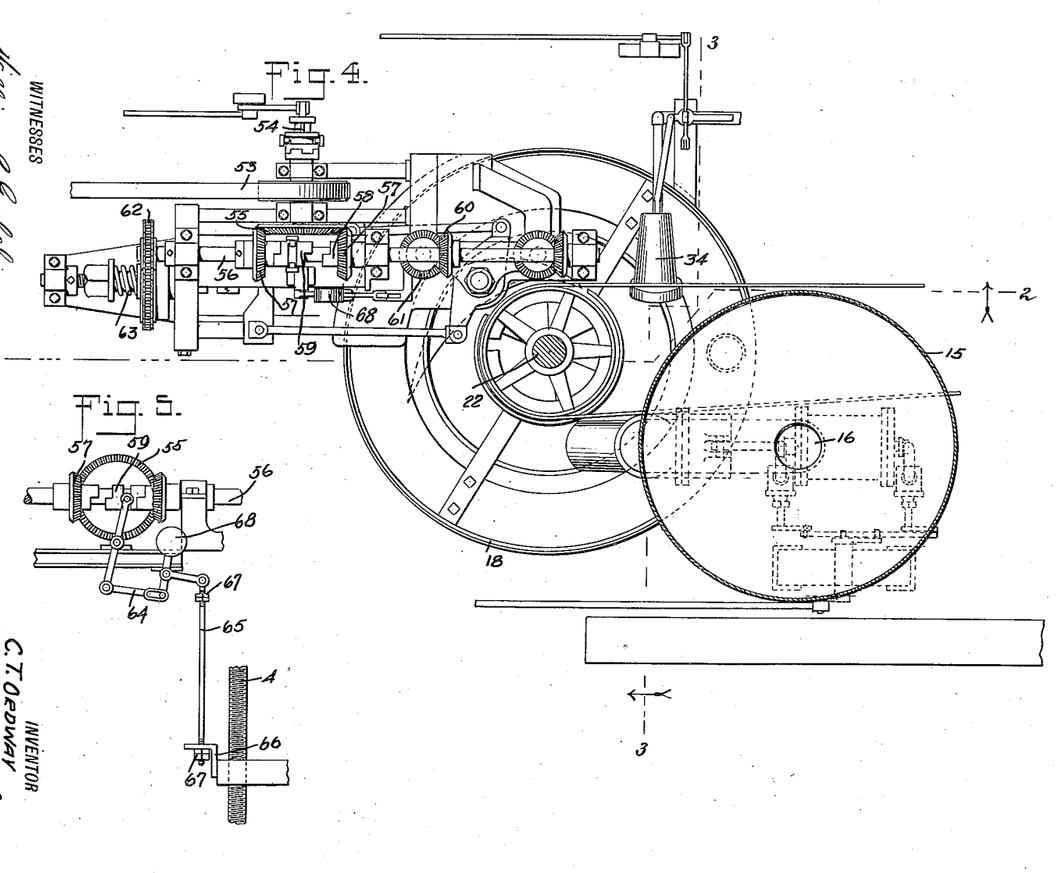
Figure 4 is a sectional plan view taken along the line 4—4 and in the direction of the arrows indicated in Figure 1.
Figure 5 is a detail of construction of certain of the parts illustrated in the foregoing figures.

To furnish means which will serve to operate all of the parts of the discharger it will be noted in Figure 4 that a suitable drive 53 serves to rotate a driving shaft 54 carrying a beveled gear 55. The shaft 56 loosely carries gears 57, each of which is formed with clutch portions 58, adapted to co-operate with clutch parts 59 of a shiftable member keyed to the shaft 56.

Furthermore gears 60 are carried by the shaft 56 which gears co-operate with corresponding gears 61 affixed one to each of the screw threaded shafts 46. Also a suitable drive 62 connects the shaft 56 with the shaft 50 and it is to be noted in this latter connection, attention being had to Figure 7 that a frictional drive for the shaft 50 is effected by providing a friction clutch 63 secured to this latter shaft. Thus if the torque of the shaft 50 at any time becomes excessive no breakage of the parts will result in that slippage may occur due to the frictional clutch 63.

Thus it will be appreciated that an operation of the drive 53 will primarily result in the shaft 56 being rotated, this effecting a movement on the part of the traveler 45 incident to the rotation of the screw threaded shaft connected thereto, thus projecting and retracting the scraper blade 41 within the pan 19.

Further through the drive 62 the shaft 50 will be operated, and this, as has been described, will cause the blade to be oscillated in the manner desired. The speed of rotation of the shaft 50 is such that very shortly after the beginning of the downward movement of the blade 41 into the pan and its upward movement out of the pan one of the travelers 52 contacts with its related clutch 51 and interengagement of these parts will be effected, thus stopping any further swinging movement of the blade. The clutch 63 will then be caused to slip and no breakage of the parts will result.

To now furnish means which will serve to reverse the operation of the parts at the end of each stroke it will be seen that the clutch element 59 is connected by means of a linkage 64, to a rod 65 which rod is in slidable engagement with the brackets 66 secured to the arm constituting the traveler 45. Furthermore the stops 67 are associated with the rod 65 and a weight 68 may be operated with the linkage 64 to retain the same in one of two extreme positions.

Figure 2:
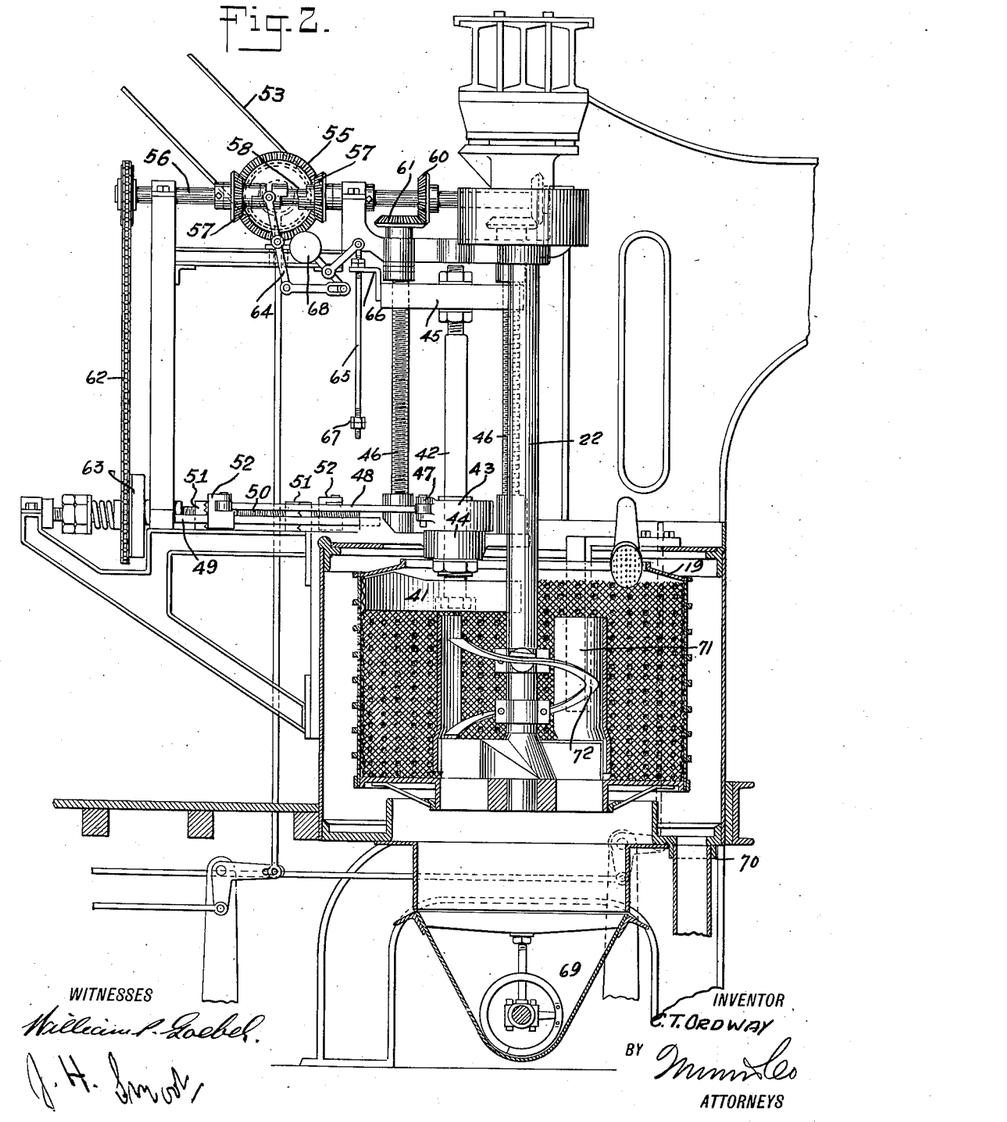
Figure 2 is a transverse sectional view thereof, taken along the line 2—2 and in the direction of the arrows indicated in Figure 4.
Figure 3:
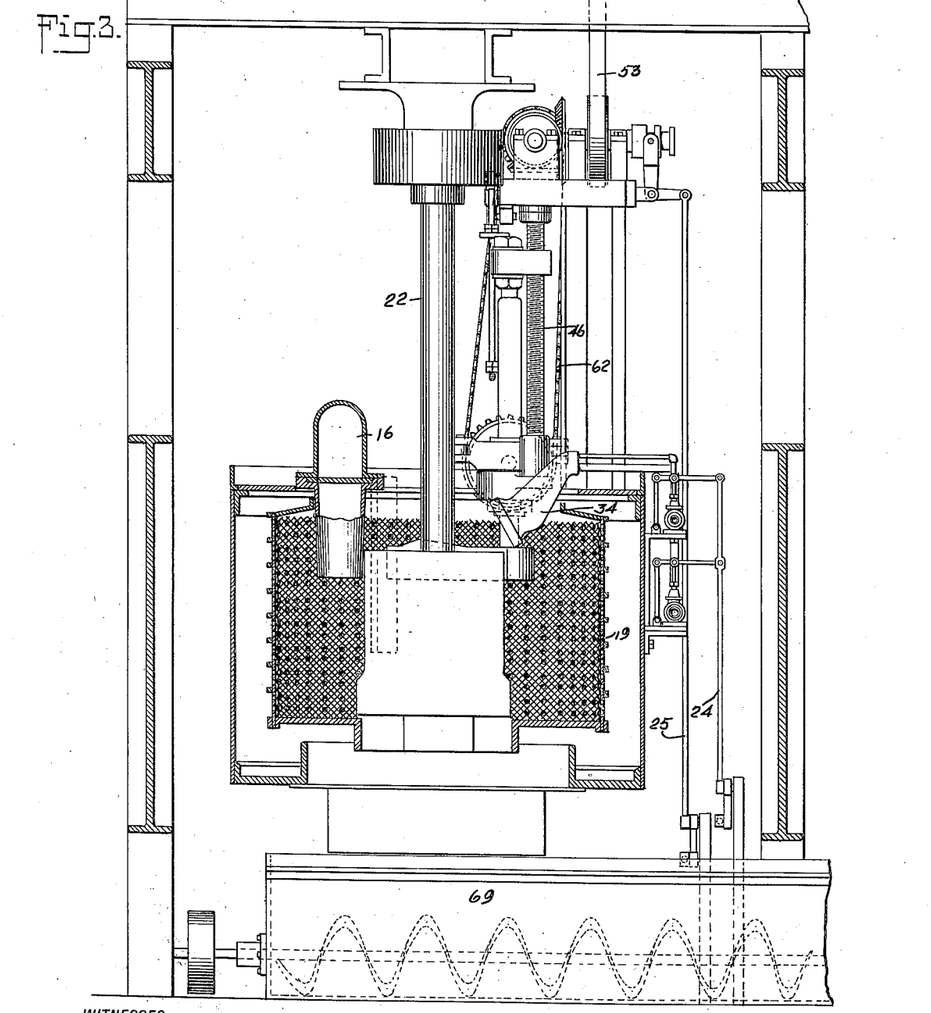
Figure 3 is a similar sectional view but taken along the line 3—3 and in the direction of the arrows indicated in Figure 4.

Thus assuming that the parts are in the position illustrated in Figures 1 and 2 it will be appreciated that the screw threaded shafts 46 will be rotated to move the traveler 45 downwardly and correspondingly actuate the blade 41. Simultaneously the blade will be moved outwardly through the medium of the traveler 52 co-operating with the shaft 50 until the parts 51 and 52 are interengaged, at which time further outward movement of the blade stops. Now when the traveler 45 reaches the limit of its downward movement it will be understood, that as in Figure 5, the bracket 66 carried thereby will contact with the lowermost stop 67, and when this occurs the rod 65 will be pulled downwardly consequently moving the linkage 64 and weight 68 whereby the clutch element 59 will be thrown to engage the clutch of the second gear 57 thus reversing the movement of both the shafts 50 and 56, and retracting the blade 41, this cycle of operation being continued until such time as the control 25 is actuated to shift the clutch element 59 to its neutral position.

Thus it will be seen that all of the objects set forth in the preamble of this specification have been accomplished, and it will be understood in connection with the discharging apparatus that the syrup will be discharged into the gutter 69, the water cast off by the purging action passing from the machine through the pipes 70, it being also noted that the syrup or mass of material removed from the centrifugal pan by the discharger may be guided into the gutter 69 by means of the baffles and worm 71 and 72 respectively, associated with the pan 19 and shaft 22.

Furthermore it will be understood that numerous modifications of structure might readily be resorted to without in the least departing from the spirit of my invention, which I claim as:

1. A discharger for a centrifugal machine including a screw threaded shaft, a traveler mounted upon said shaft, a rod carried by said traveler, a blade secured to the end of said rod, and means for turning said rod.

2. A discharger for a centrifugal machine including a screw threaded shaft, a traveler mounted upon said shaft, a rod carried by said traveler, a blade secured to the end of said rod, and means for rotating said rod in one direction for a predetermined number of revolutions, said means subsequently automatically reversing and rotating said rod in the opposite direction.

3. A discharger for centrifugal machines including a screw threaded shaft, a traveler mounted upon said screw threaded shaft, a rod carried by said traveler, a blade secured to the opposite end of said rod, a secondary shaft connected to said first named shaft whereby to move said traveler, and means for reversing the movement of the parts upon the traveler having moved a predetermined distance.

4. A discharger for centrifugal machines including a screw threaded shaft, a traveler mounted upon said shaft, a rod secured to said traveler, a blade carried upon the outer end of said rod, a secondary shaft, a reversing clutch secured to said secondary shaft, means for driving said clutch, and means for automatically reversing said clutch when said traveler is moved to a predetermined distance.

5. A discharger for centrifugal machines including a screw threaded shaft, a traveler mounted upon said shaft, a rod secured to said traveler, a blade carried upon the outer end of said rod, a secondary shaft, a reversing clutch secured to said secondary shaft, means for driving said clutch, a rod connected to said reversing clutch, stops secured to said rod, a bracket carried by said traveler, said bracket engaging said rod whereby upon said traveler having moved to a predetermined distance, and engaging one of said stops, the clutch will be automatically reversed and the direction of movement of said traveler also automatically reversed.

6. A discharger for centrifugal machines including a rod, a blade secured to said rod, an ear attached to and extending from said rod, a screw threaded shaft, a traveler mounted upon said screw threaded shaft, and a secondary rod secured to said traveler and connected to said ear whereby upon said shaft being rotated, said blade will be swung.

7. A discharger for centrifugal machines including a rod, a blade secured to said rod, an ear attached to and extending from said rod, a screw threaded shaft, a traveler mounted upon said screw threaded shaft, a secondary rod secured to said traveler and connected to said ear whereby upon said shaft being rotated said blade will be swung, and means for automatically reversing the direction of rotation of said shaft when the blade has been swung to a predetermined distance.

8. A discharger for centrifugal machines including a rod, a blade secured to said rod, a member presenting a pair of ears attached to said rod, an oppositely screw threaded shaft, a traveler associated with each series of threads upon the same, means for rotating said shaft whereby to move said travelers in opposite directions, and rods extending between and connected to said travelers and ears.

9. A discharger for centrifugal machines, including in combination with the pan of the centrifugal machine, of a blade adapted to be reciprocated, and oscillated within said pan, said pan being formed with a discharge opening, and a baffle and worm within said pan adapted to force the material loosened by said blade through the discharge opening of the pan.

10. A discharger for centrifugal machines including a screw threaded shaft, a traveler mounted upon said shaft, a rod secured to said traveler, a blade attached to said rod, a secondary screw threaded shaft, a traveler also mounted upon said secondary screw threaded shaft, means for connecting said latter traveler with said rod, a driving shaft, said driving shaft being connected to both of said screw threaded shafts whereby upon said driving shaft being rotated the travelers will cause a reciprocation and partial rotation of the rod mounting said blade.

11. A discharger for centrifugal machines including a screw threaded shaft, a traveler mounted upon said shaft, a rod secured to said traveler, a blade attached to said rod, a secondary screw threaded shaft, a traveler also mounted upon said secondary screw threaded shaft, means for connecting said latter traveler with said rod, a driving shaft, a reversing clutch carried by said driving shaft, said driving shaft being connected to both of said screw threaded shafts whereby upon said driving shaft being rotated the travelers will cause a reciprocation and partial rotation of the rod mounting said blade, and means connected to one of said travelers for effecting an operation of said reversing clutch upon said traveler having moved a predetermined distance.

12. A discharger for centrifugal machines, including a rod, a blade carried thereby, a rotatable shaft, a traveller movable upon said shaft, and a secondary rod connecting said traveller with the first named rod for moving said blade when said shaft is rotated.

CARROLL THOMAS ORDWAY.